United States Patent [19]

Holcombe, Jr. et al.

[11] Patent Number: 4,769,074
[45] Date of Patent: * Sep. 6, 1988

[54] BINDER/SUSPENSION COMPOSITION AND METHOD OF PREPARATION THEREOF

[75] Inventors: Cressie E. Holcombe, Jr., Knox County; Lloyd R. Chapman, Anderson County, both of Tenn.

[73] Assignee: ZYP Coatings, Inc., Oak Ridge, Tenn.

[*] Notice: The portion of the term of this patent subsequent to Dec. 2, 2004 has been disclaimed.

[21] Appl. No.: 128,808

[22] Filed: Dec. 4, 1987

Related U.S. Application Data

[63] Continuation-in-part of Ser. No. 9,716, Feb. 2, 1987, Pat. No. 4,711,666.

[51] Int. Cl.$^4$ ..................... C09K 15/02; C09K 15/32
[52] U.S. Cl. ............................ 106/14.12; 252/506; 252/508; 252/516
[58] Field of Search ............... 106/14.12, 1.12, 308 Q, 106/38.3, 38.22, 38.35, 287.34; 252/506, 508, 516

[56] References Cited

U.S. PATENT DOCUMENTS

| | | | |
|---|---|---|---|
| 2,749,254 | 6/1956 | Slyh et al. | 106/308 R |
| 2,927,043 | 3/1960 | Stetson | 106/1.12 |
| 2,995,453 | 8/1961 | Noble et al. | 106/38.27 |
| 3,140,193 | 7/1964 | Kane | 427/258 |
| 3,348,929 | 10/1967 | Valtschey et al. | 106/1.12 |
| 3,510,347 | 5/1970 | Strater | 106/14.12 |
| 3,960,592 | 6/1976 | Birchall et al. | 106/308 Q |
| 4,301,387 | 11/1981 | Schiffarth | 428/367 |
| 4,319,924 | 3/1982 | Collins, Jr. et al. | 106/14.12 |
| 4,418,097 | 11/1983 | Misra | 427/113 |
| 4,559,270 | 12/1985 | Sara | 428/408 |

*Primary Examiner*—Paul Lieberman
*Assistant Examiner*—Helene Kirschner
*Attorney, Agent, or Firm*—Pitts and Brittian

[57] ABSTRACT

A binder/suspension liquid for use with refractory compounds and the like. Oxidation prevention coatings for up to at least 1000 degrees Centigrade are described. Both a graphite non-conductive and a conductive coating are described for use in coating graphite crucibles, graphite electrodes, and the like. Typical compositions utilize a binder/suspension liquid phase in an amount from about 40 to about 55 wt. % of the total paintable mixture. This binder/suspension liquid phase is formed by intimately mixing colloidal silica solution, mono-aluminum phosphate solution and alcohol. The non-conducting embodiment of the graphite coating is produced by mixing finely divided boric acid and silicon carbide with the binder/suspension liquid phase. The preferred conductive coating substitutes a mixed TiC-SiC for the SiC of the non-conductive embodiment. The resultant material is very stable (i.e., does not settle), is paintable upon the graphite, and is easily dried at or near room temperature. A few thin coats, with drying between applications, totaling only about 0.15 to about 0.23 mm prevents detrimental oxidation through several cycles to at least 1000 degrees C. Other applications of the binder/suspension agent are discussed.

16 Claims, No Drawings

BINDER/SUSPENSION COMPOSITION AND METHOD OF PREPARATION THEREOF

This is a Continuation-In-Part application based upon parent application Ser. No. 9716, filed Feb. 2, 1987, now U.S. Pat. No. 4,711,666, due to issue Dec. 8, 1987.

TECHNICAL FIELD

This invention relates generally to binder/suspension compositions and more particularly to a binder/suspension composition, and the method of its preparation, typically useful in the making of coatings containing refractory compounds. A specific utilization of the composition is described, for example, for the preparation of a paintable coating for graphite that, when dry, substantially prevents graphite oxidation up to at least 1000 degrees C.

BACKGROUND ART

Graphite is utilized in many forms in the chemical and metallurgical industries for high temperature applications. Typical of these applications are for crucibles used in the melting of many metals, for electrodes in electro-arc furnaces, etc. Graphite crucibles or molds, for example, exhibit good mechanical strength and excellent thermal stability under the temperature conditions encountered. These same attributes are important in the electrodes.

A major deficiency to the use of graphite and other carbonaceous articles is that they rapidly oxidize and erode at temperatures above about 500 degrees C. since the carbon reacts with oxygen to form CO and/or $CO_2$. Thus, in the case of the crucibles, they become thinned and periodically must be replaced. Graphite rods, when used as electrodes, "pencil down" at the end and continue to erode. While some consumption is expected in the melting process, the oxidation loss accelerates the erosion/corrosion and reduces the current-carrying capacity. Accordingly, the electrode must be progessively advanced into the melt and then additional lengths must be added.

A number of coating materials have been developed to reduce the problem of oxidation. Typical of these coatings are described in U.S. Pat. No. 2,995,453, issued to R. D. Noble, et al., on Aug. 8, 1961; U.S. Pat. No. 4,559,270, issued to R. V. Sara on Dec. 17, 1985; U.S. Pat. No. 4,418,097, issued to M. S. Misra on Nov. 29, 1983; U.S. Pat. No. 3,140,193, issued to J. S. Kane on July 7, 1964; U.S. Pat. No. 4,301,387, issued to J. Schiffarth, et al., on Nov. 17, 1981; U.S. Pat. No. 3,348,929, issued to A. J. Valtschev, et al., on Oct. 24, 1967; and U.S. Pat. No. 2,749,254, issued to J. A. Slyh, et al., on June 5, 1956. Many of these coatings must be applied under conditions of elevated temperature under an inert atmosphere in order to achieve a highly adherent coating. These processes, due to the extremes of conditions, can result in gaps of the coating leaving those areas to be subjected to oxidation. In the '270 patent, for example, heating to at least 1100 degrees C. is required; in '254, a temperature of about 2200 degrees C. is required. The coating of '929 requires "metallization", and in '387 the coating is applied in the form of pre-formed sheet material.

The coatings of the prior art contain various forms of silicon compounds and alumina compounds: silicon carbide, sodium silicate, mullite being typical. Others have varying proportions of boron, phosphates, etc., including many of the refractory oxides. Although some of these compounds are inexpensive, others are not. Furthermore, many of the coatings derived from silicates tend to be hydroscopic (collect moisture from the atmosphere on the surface). This excessive moisture can be detrimental when the coated object comes in contact with molten metal, for example. In addition, these coatings are generally so electrically insulative that they cannot be used on electrodes proximate the current clamps. At least a portion of the shortcomings of the prior art coatings is due to an inadequate binder/suspension agent for "protective" element of the coating composition.

Accordingly, it is one object of the present invention to provide a material for effecting a corrosion resistant coating on graphite and similar carbonaceous bodies.

It is another object to provide a material that forms an effective protection against oxidation of graphite and like materials that does not require "conditioning" at elevated temperatures.

Another object is to provide a "paint-like" material that can be applied to graphite and like materials and then dried at near room temperature to achieve an oxidation prevention coating.

Still another object is to provide a method for producing a "paint-like" material having long shelf life that can be applied to graphite and the like materials and dried at near room temperature to produce an oxidation prevention coating.

A further object is to provide an inexpensive oxidation prevention coating for graphite and like materials that can be formulated to be either electrically conductive or non-conductive.

It is also an object of the present invention to provide a binder/suspension agent for use with refractory compounds and the like so as to produce, for example, a coating useful to prevent oxidation of graphite.

An additional object of the present invention is to provide a method of producing a binder/suspension agent for use with refractory compounds and the like.

These and other objects of the present invention will become apparent upon a consideration of the following drawing and a complete description which follow.

DISCLOSURE OF THE INVENTION

In accordance with the present invention, there is provided a binder/suspension agent useful, for example, in producing a coating for protecting graphite and like substances from oxidation up to at least 1000 degrees C. As used herein, the term "binder/suspension agent" is meant to mean a composition that can be used as a binder and/or suspension agent (or liquid). Also, a method for producing the agent for achieving that coating forms an essential part of the present invention. A paintable mixture, which upon drying forms the coating, is produced by thoroughly mixing colloidal silica solution (35–65 vol. %) and mono-aluminum phosphate solution followed by the addition of about 0.5–70% by volume (based on combined total of other reagents) of a suitable alcohol. This mixture is aged or further mixed to produce a stable thick liquid phase. For use in the protection of graphite, to this liquid phase is added up to about 17.6 wt % boric acid powder and about 45–50 wt % silicon carbide (or similar) powder to produce a glass-type material suitable for painting on the graphite in one or more thin layers to produce the oxidation resistant coating. A portion of the SiC can be replaced with, for example, TiC to produce an electrically conductive coating up to about 600 degrees C. The final preferred composition has the following approximate molar percentages of the glass-forming species: $B_2O_3$, 9.7%; $SiO_2$, 51.8%; $Al_2O_3$, 9.6; and $P_2O_5$, 29.0%.

DESCRIPTION OF THE PREFERRED EMBODIMENT

The present invention is based, in part, upon the discovery that an adherent impervious glass-like coating can be achieved on graphite at near room temperature, with that coating providing substantial protection against oxidation of the graphite up to at least 1000 degrees C. The coating is formulated using a binder/suspension liquid phase formed from colloidal silica solution, mono-aluminum phosphate solution and an alcohol. To this is added powdered boric acid and silicon/titanium carbide to form the composition of the glass-like coating produced by drying at near room temperature. As discussed hereinafter, alternate materials are potentially useful in the present invention.

A preferred composition for the binder/suspension liquid phase is prepared by intimately mixing substantially equal liquid volumes of colloidal silica solution and mono-aluminum phosphate solution at room temperature. A suitable colloidal silica solution is commercially available Nyacol 830 as obtained from Nyacol Products, Ashland, MA. This consists of 8 millimicron silica spheres in dispersion containing 0.45% $Na_2O$ has a pH=10.7, and is a clear watery liquid having a density of 1.27 g/cm. A commercially available mono-aluminum phosphate solution is typically obtained from Albright & Wilson, Inc., Richmond, Va. Its formula is $Al(H_2PO_4)_3$, with 8.0% $Al_2O_3$ and 33.7% $P_2O_5$, the pH is 1.0 and it is a clear syrupy liquid having a density of 1.74 g/cm3. Other sources of similar colloidal silica and mono-aluminum phosphate solutions will be known by those versed in the art. During continued stirring, ethyl alcohol $C_2H_5OH$:95% ethanol, 0.79 g/cm$^3$) is added in an amoun approximately 11% by volume of the combined total of the other constituents. As discussed in more detail hereinafter, other alcohols are suitable in the preparation of this binder/suspension liquid. This yields a sticky and creamy precipitate which, upon standing with occasional stirring while covered, produces a moderately thick milky "liquid" phase that is very uniform in consistency, having a density of about 1.33 g/cm$^3$, and exhibiting a very good shelf life. High speed mixing can be utilized in place of the "aging" by standing. This liquid is believed to be a mixed aluminum phosphate-silica agglomerate/aggregate dispersed in a phosphoric acid-alcohol mix. The preferred liquid-phase material has the following weight and mol percentages:

TABLE I

| Item | wt % | mol % Excluding H$_2$O | mol % Including H$_2$O |
| --- | --- | --- | --- |
| SiO$_2$ | 12.96 | 42.3 | 5.6 |
| Al$_2$O$_3$ | 4.06 | 7.8 | 1.0 |
| P$_2$O$_5$ | 17.12 | 23.7 | 3.2 |
| Na$_2$O | 0.19 | 0.6 | 0.1 |
| C$_2$H$_5$OH | 6.02 | 25.6 | 3.4 |
| H$_2$O | 59.65 | | 86.6 |

In order to produce non-conducting embodiment of an oxidation prevention coating for graphite, boric acid ($H_3BO_3$) and silicon carbide powders (greater than 99% purity, less than 44 micrometers) are added to the above-described liquid phase. The proportions are, in the preferred embodiment, 50% by weight liquid phase, 2.5 wt % $H_3BO_3$ and 47.5 wt % SiC. This results in a "paint" having the following composition of its binder phase (i.e., excluding the SiC):

TABLE II

| Item | mol % |
| --- | --- |
| B$_2$O$_3$ | 9.7 |
| SiO$_2$ | 51.8 |
| Al$_2$O$_3$ | 9.6 |
| P$_2$O$_5$ | 29.0 |

While the mechanism of forming a protective coating with this paint is not fully understood, it is believed that the mono-aluminum phosphate phase of the binder/suspension composition at somewhat elevated temperature forms $AlPO_4$ and the initial molar ratio of $Al_2O_3$:$P_2O_5$ of 0.33 provides excess $P_2O_5$ such that the phases $BPO_4$, $AlPO_4$, $2SiO_2 \cdot P_2O_5$ and $SiO_2$ exist, and the $BPO_4$, $AlPO_4$ and $SiO_2$ form a solid solution. With a knowledge of the melting points of the $2SiO_2 \cdot P_2O_5$—$SiO_2$ eutectic and the weighted average of estimated melting point of the solid solution, the estimated melting point of the resultant glass-like coating is at least 1300 degrees C.

A conductive protective coating for graphite is produced in a similar manner. The above-described liquid phase, i.e., the binder/suspension agent, is prepared using colloidal silica solution, mono-aluminum phosphate solution and ethyl alcohol (or other alcohols) as described above. In a preferred embodiment, to this liquid phase (as 42.0% by weight) is added 2.1 wt % $H_3BO_3$ powder, 45.9 wt % TiC powder, and 10.0 wt % SiC powder. As above, the powders were greater than 99% pure and had a particle size less than about 44 micrometers. This coating material was demonstrated to be conductive up to about 600 degrees C. at which time the TiC oxidizes. For graphite electrodes this conversion from conductive to non-conductive is no problem as the region on the electrode where current clamps are applied is maintained below that temperature. The non-conductive form at higher temperatures is not detrimental in the melt.

The graphite coatings, prepared as described above, were tested for effectiveness by applying the same to rectangular parallelepipeds of graphite (various sources) having dimensions of 1-2 cm×1-2 cm×2-3 cm. The coatings were generally applied in three coats. Drying of each coat was utilized prior to the application of the next coat. Edges were coated one additional time to prevent failure due to possible edge flaws in previous coats. The total thickness of the dried coating was about 0.15 to 0.23 mm on each test unit. Each sample was subjected to possible oxidation by cyclic heating in air from 20 degrees C. to 1000 degrees C., holding at that temperature for 1.5 hours, and then furnace-cooling back to 20 degrees. This cycling was repeated with the weight loss (in percent) determined after each cycle. The results were compared with those for unprotected graphite.

Unprotected graphite (Stackpole 2020), after one cycle exhibited a 80% weight loss, and after two cycles the sample was completely oxidized.

In contrast, the samples protected with the preferred non-conductive coating lost only about 10% by weight after ten cycles at 1000 degrees C. The results for the preferred conductive coating demonstrated that the sample lost less than 10% with five cycles in this test.

The electrically conductive coating oxidizes above 600 degrees C on the first cycle and is thus non-conductive thereafter. In all the tests used, the graphite was Stackpole Grade 2020. Tests with other grades of graphite (e.g., Union Carbide Grades ATJ, and CS and Poco Carbon Grade AXF-5Q) gave similar results relative to the degree of protection afforded by these coatings.

The coefficient of thermal expansion (CTE) of graphite is variable, since graphite is hexagonal, but is generally about $4-5 \times 10^{-6}$/degrees C. Some grades of graphite have a CTE as high as $8 \times 10^6$/degrees C. Ideally it is thought that the protective coating must "breathe" so as to not crack during expansion or contraction. Silicon carbide has two forms: alpha (hexagonal) with a CTE of about $4-5.5 \times 10^{\times 6}$/degrees C.; and beta (cubic) with a CTE of about $3.9 \times 10^{-6}$/degrees C. A study was performed to determine the effect, if any, of the type of SiC upon the performance of the protective coatings. In general, all of the coatings using alpha SiC allowed no more than 10% wt loss in five cycles. Tested were Norton Co. "600 Grit", and Ferro Corp. "600 Grit". Superior Graphite Co. Type HSC-95FCL beta SiC also produced a coating giving less than 10% wt loss in five cycles; Superior Graphite Co, Type 95K/MMC beta SiC produced a coating that lost less than 10% over eleven cycles.

An investigation was made to determine the necessity of the three-component binder/suspension agent. When alcohol was added to a colloidal silica solution alone, the liquid remained clear, no precipitate formed and thus was determined to be unacceptable as a binder. When alcohol was added to the mono-aluminum phosphate solution, a precipitate formed but could not be dispersed. This would produce a binder but has no suspension properties. Furthermore, if used as a paint, such material would be very hydroscopic. Any attempt at drying results in a sticky gum that balloons/blisters when the coating is fully dried.

A suitable binder/suspension agent has been demonstrated using, as an alternate to ethyl alcohol, several other alcohols. Specifically demonstrated have been such agents formulated using methyl alcohol, ethyl alcohol, n-propyl alcohol or isopropyl alcohol. These are members of the monohydric class of alcohols. Other suitable alcohols include mixtures of the monohydric class of alcohols, and other low molecular weight alcohols.

When colloidal silica solution and mono-aluminum phosphate are mixed, bloating of the coating was reduced. This mixture is similar to some of the coatings of the prior art. However, the coating was very hydroscopic. The resultant material has no suspending ability for other additives to effect a oxidation prevention coating for graphite.

While the preferred liquid phase is produced from equal volumetric quantities of the colloidal silica solution and the mono-aluminum phosphate solution, with a preferred addition of about 9 to 13 vol. % alcohol based upon the total volume of the other constituents, other ratios can be used. A usable range of these principal constituents is 35 to 65 vol. % of the colloidal silica solution, 35 to 65 vol. % of the mono-aluminum phosphate solution, and 0.5 to 70% of the alcohol. Thus, the colloidal silica solution can be about 0.54 to about 1.86 times the amount of the mono-aluminum phosphate solution. If the colloidal silica solution content exceeds 65% of the mix, the desirable uniform, moderately thick liquid does not result—the mix has large coagulated regions and no suspendability. If the mono-aluminum phosphate solution content exceeds about 65% of the mix, the liquid phase is gummy, hygroscopic and will not dry. Alcohol additive levels below 0.5% do not adequately produce the preferred liquid with its suspension characteristics; and above 45% of alcohol, the suspension characteristics are generally lost from excessive dilution of the liquid phase. However, when using methyl alcohol, a suitable agent is obtained at up to about 70%.

Although the binder/suspension composition disclosed herein is very useful for the formulation of an oxidation resistant coating for graphite, it can be used with, for example, many refractory compounds and mixtures of refractory compounds. Satisfactory applications include, for example, mixtures of various oxides, carbides, nitrides and silicates. Typical of these refractory materials are $ZrO_2$ (stabilized as well as unstabilized), $SiO_2$, $Al_2O_3$, TiC, BN, $Si_3N_4$, TiN, $TiO_2$ and aluminum silicate. Also standard refractory colorant/pigments are useful with this binder/suspension agent to form high temperature "inks". The only restriction is that the refractory compound be substantially stable under the acidic condition of the binder/suspension agent. Depending upon the loading of the refractory compound in the binder/suspension agent, a full range of viscosities can be prepared from "inks" to "paints" to "pastes". These mixtures can be applied to many substrates including ceramics and metals.

Furthermore, the binder/suspension agent alone can be used as a "rigidizer" with substrates formed of fibrous refractory materials, or can be mixed with a refractory to produce a coating for these and other substrates. It can be used in "lay up" or "buildup" structures and will have applications for appropriately coating plasma sprayed material.

The terms colloidal, agglomerate, aggregate, particle, etc., as used herein are meant those conditions as expressed in the definitions found in "The Condensed Chemical Dictionary", 10th Ed., Van Nostrand Reinhold Company (1981) [Library of Congress Catalogue Card: 80-29636].

From the foregoing it will be apparent to one versed in the art that a useful binder/suspension agent has been described. Further, compositions for the prevention of graphite oxidation to temperature up to at least 1000 degrees C. are given as a typical use for the agent. Both non-conducting and conducting coatings have been described. Furthermore, a useful binder/suspension composition has been described together with a method of preparation thereof. Although test data is limited primarily to a preferred embodiment, there is no intent to limit the composition to that of the preferred embodiment. Rather, the invention is to be limited only by the appended claims and their equivalents when taken together with the complete disclosure of the invention.

We claim:

1. A binder/suspension liquid, which comprises:
   a substantially pure colloidal silica solution of a selected volume;
   a substantially pure mono-aluminum phosphate solution of a selected volume, said selected volume of said mono-aluminum phosphate solution being from about 0.54 to about 1.86 times said selected volume of said colloidal silica solution, said colloidal silica solution and said mono-aluminum phosphate solution being intimately mixed; and substantially pure low molecular weight alcohol of a selected volume, said selected volume of said alcohol being from about 0.005 to 0.70 times the combined selected volumes of said colloidal silica solution and said mono-aluminum phosphate solution, said alcohol intimately mixed with said mixed colloidal silica solution and mono-aluminum phosphate solution.

2. The binder/suspension liquid of claim 1 wherein said colloidal silica solution and said mono-aluminum phosphate solution are present in about equal volumes, and said alcohol is about 9–13% by volume of the combined volumes of said colloidal silica solution and said mono-aluminum phosphate solution.

3. The binder/suspension liquid of claim 2 wherein said alcohol is about 11% by volume of the combined volumes of said colloidal silica solution and said mono-aluminum phosphate solution.

4. The binder/suspension liquid of claim 1 wherein said low molecular weight alcohol is selected from monohydric alcohols.

5. The binder/suspension liquid of claim 4 wherein said alcohol is selected from the monohydric group consisting of methyl alcohol, ethyl alcohol, n-propyl alcohol, isopropyl alcohol and mixtures thereof.

6. A method of producing a binder/suspension liquid which comprises the steps of:
intimately mixing a selected volume of substantially pure colloidal silica solution with a selected volume of substantially pure mono-aluminum phosphate solution, said selected volume of said mono-aluminum phosphate being from about 0.54 to about 1.86 times said selected volume of said colloidal silica solution; and
adding a selected volume of substantially pure monohydric alcohol during said intimate mixing step, said selected volume of said alcohol being from about 0.005 to about 0.70 times the combined volume of said colloidal silica solution and said mono-aluminum phosphate solution.

7. The method of claim 6 wherein said selected volume of said colloidal silica solution is substantially equal to said selected volume of said mono-aluminum phosphate solution, and said selected volume of said alcohol is about 9 to about 13% by volume of the combined volumes of said colloidal silica solution and said mono-aluminum phosphate solution.

8. The method of claim 7 wherein said selected volume of said alcohol is 11% by volume of the combined volumes of said colloidal silica and said mono-aluminum phosphate solution.

9. The method of claim 6 comprising the further steps of:
permitting said mixture of said colloidal silica, said mono-aluminum phosphate and said alcohol to stand without mixing for a selected time period; and
resuspending solids of said liquid by high speed mixing to achieve long shelf life of said binder/suspension liquid.

10. The method of claim 6 wherein said alcohol is selected from the monohydric group consisting of methyl alcohol, ethyl alcohol, n-propyl alcohol, isopropyl alcohol and mixtures thereof.

11. A method of producing a binder/suspension liquid which comprises the steps of:
intimately mixing selected volumes of substantially pure colloidal silica and substantially pure mono-aluminum phosphate; and
adding a selected volume of a substantially pure monohydric alcohol during said intimate mixing step, said selected volume of said alcohol being from about 0.005 to about 0.70 times the combined volumes of said colloidal silica and said mono-aluminum phosphate.

12. The method of claim 11 wherein said selected volume of said alcohol is about 11% by volume of the combined volumes of said colloidal silica solution and said mono-aluminum phosphate solution.

13. The method of claim 11 comprising the further steps of:
permitting said mixture of said colloidal silica, said mono-aluminum phosphate and said alcohol to stand without mixing for a selected time period; and
resuspending solids of said liquid by high speed mixing to achieve long shelf life of said binder/suspension liquid.

14. A method of producing a binder/suspension liquid which comprises the steps of:
intimately mixing selected volumes of substantially pure colloidal silica and substantially pure mono-aluminum phosphate; and
adding during said intimate mixing step about 11% by volume of a substantially pure monohydric alcohol based upon said combined volumes of said colloidal silica and said mono-aluminum phosphate.

15. The method of claim 14 comprising the further steps of:
permitting said mixture of said colloidal silica, said mono-aluminum phosphate and said alcohol to stand without mixing for a selected time period; and
resuspending solids of said liquid by high speed mixing to achieve long shelf life of said binder/suspension liquid.

16. The method of claim 14 wherein said alcohol is selected from the monohydric group consisting of ethyl alcohol, methyl alcohol, isopropyl alcohol, n-propyl alcohol and mixtures thereof.

* * * * *